(No Model.)
W. V. SNYDER.
TOY.
No. 492,061.  Patented Feb. 21, 1893.
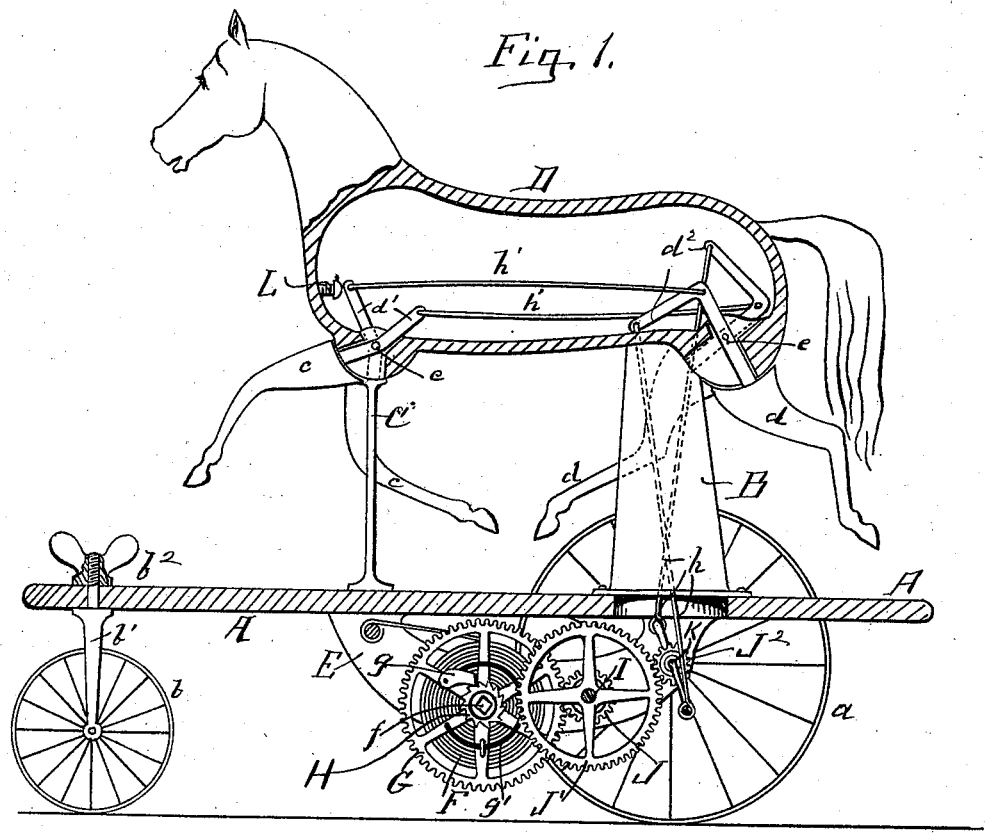
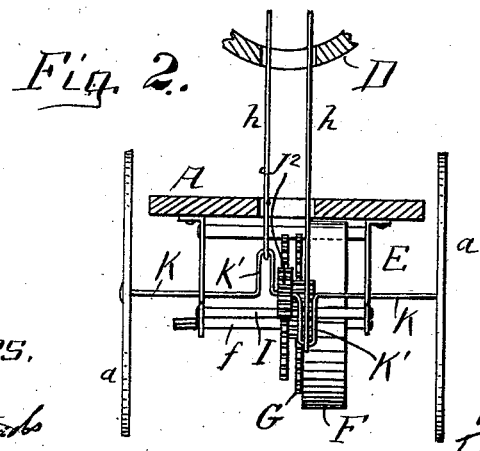

UNITED STATES PATENT OFFICE.

WALDO V. SNYDER, OF CANTON, OHIO.

TOY.

SPECIFICATION forming part of Letters Patent No. 492,061, dated February 21, 1893.

Application filed August 1, 1892. Serial No. 441,808. (No model.)

*To all whom it may concern:*

Be it known that I, WALDO V. SNYDER, a citizen of the United States, residing at Canton, in the county of Stark and State of Ohio, have invented certain new and useful Improvements in Toys; and I do hereby declare that the following is a full, clear, and exact description of the same, reference being had to the annexed drawings, making a part of this specification, and to the letters of reference marked thereon, in which—

Figure 1, is a longitudinal section showing the body of the horse properly mounted upon the traveling platform. Fig. 2, is an end view looking toward the end of the toy, and illustrating a portion of the body in section.

The present invention has relation to toys, and it consists in the different parts, and combination of parts hereinafter described and particularly pointed out in the claim.

Similar letters of reference indicate corresponding parts in both the figures of the drawings.

In the accompanying drawings A represents the platform which may be of any desired size, reference being had to the size of the toy designed to be constructed, and is supported upon the traveling wheels $a$, and $b$. To the top or upper side of the platform A, are securely attached in any convenient and well known manner, the posts or standards B, and C; to the top or upper ends of which posts or standards is attached the body D, which in this instance, is that of a horse; but it will be understood that the body of any other quadruped may be substituted for the body of the horse shown, without departing from the nature of my invention. To the body D, are pivotally attached the legs $c$ and $d$, by means of the arms $d'$, and $d^2$, which arms are connected to the body D, by means of the bolts or rivets $e$, which bolts or rivets are located substantially as illustrated in Fig. 1. Upon the bottom or under side of the platform A, is securely attached the housing E, which housing is for the purpose of holding a train of gear wheels, said gear wheels consisting of the number and kind hereinafter described.

Upon the winding shaft $f$, are located the spring F, the master wheel G, and the ratchet wheel H. The ratchet wheel H, and the spring F, are securely attached to the winding shaft $f$, in the ordinary manner; while the master wheel is loosely mounted upon the winding shaft $f$, said master wheel rotates with the winding shaft $f$, in one direction only; the connection for causing the winding shaft $f$, and the master wheel G, to rotate in unison, being made by means of the ratchet wheel H, the detent $g$, and the spring $g'$. Upon the shaft I, are located and securely attached the pinion J; and the wheel J' the pinion J, meshing with the master wheel G, and the wheel J', meshes with the pinion $J^2$, which pinion is securely attached to the crank shaft K. The crank shaft K is provided with the oppositely timed cranks K', to which oppositely timed cranks are journaled the pitmen $h$, which pitmen extend up through the platform A, and the hollow post B, their top or upper ends being pivotally connected to the L-shaped arms $d^2$, substantially as illustrated in Fig. 1. To the L-shaped arms $d^2$, are pivotally connected the wires $h'$, which wires extend forward and are pivotally connected at their front or forward ends to the arms $d'$. The front or forward end of the platform A, is supported at the required height by means of the traveling wheel $b$, and the bracket $b'$, which bracket extends up through the platform A, as illustrated in Fig. 1, and that portion of the bracket which extends above the platform is screw threaded, and is so formed for the purpose of receiving the screw threaded nut $b^2$.

In use the spring F, is wound by means of rotating the winding shaft $f$, which spring furnishes the power for propelling the toy. When it is desired to have the toy proper move in a straight line, the traveling wheel $b$, is set in a line with the traveling wheel $a$ and when it is desired to have the toy travel around the circle the traveling wheel $b$, is set at an angle to the rear traveling wheels $a$, it being understood that the degree of angularity of the traveling wheel $b$, regulates the diameter of the circle traveled by the toy. For the purpose of adjusting the traveling wheel $b$, to any desired angle, the thumb screw is loosened, thereby releasing the bracket $b'$, after which the bracket can be turned, carrying with it the traveling wheel $b$. When the traveling wheel $b$, has been set or adjusted, to the desired angle, the screw threaded nut $b^2$, is tightened, thereby securely holding the traveling wheel $b$ and the bracket $b'$, at the desired point of adjustment. The body D, should be adjusted at such a height that the hoofs will not strike the top or upper side of the platform A. For the purpose of producing a clicking sound, as the legs move, the studs L, are provided, which studs are so adjusted that the arms $d'$, will strike the heads of the studs as they are brought forward. In the drawings but one stud L, is shown; but it will be understood that two studs may be used one for each of the arms $d'$; or if desired a bar of sufficient length may be substituted for the two studs; as the only object to be accomplished is to provide a surface for the top or upper ends of the arms $d'$, to strike against.

Having fully described my invention, what I claim as new, and desire to secure by Letters Patent, is—

The combination of the traveling platform A, having fixed thereto, the body D, the pivoted legs C, and means for communicating motion to the traveling platform A, and the legs $c$, and $d$, and the stud L, substantially as and for the purpose specified.

In testimony that I claim the above I have hereunto subscribed my name in the presence of two witnesses.

WALDO V. SNYDER.

Witnesses:
CHAS. M. STANDS,
F. W. BOND.